Jan. 8, 1924.

O. A. GAGE

HOSE CLAMP

Filed Aug. 6, 1923

1,479,988

Inventor

Owen A Gage

Patented Jan. 8, 1924.

1,479,988

UNITED STATES PATENT OFFICE.

OWEN A. GAGE, OF MUSKEGON, MICHIGAN.

HOSE CLAMP.

Application filed August 6, 1923. Serial No. 655,846.

*To all whom it may concern:*

Be it known that I, OWEN A. GAGE, a citizen of the United States, residing at Muskegon, in the county of Muskegon and State of Michigan, have invented certain new and useful Improvements in Hose Clamps, of which the following is a specification.

My invention relates to improvements in hose clamps, and more particularly for use upon hose used to connect an automobile radiator with the water jacket upon the engines, for air brake couplings, for heavy fire hydrant hose, and like uses, and its object is to provide a hose coupling or clamp that may be readily, quickly and easily applied upon or disconnected from a hose, and that will hold the hose absolutely securely upon its bearings without danger of cutting or injuring the hose.

Figure 1:
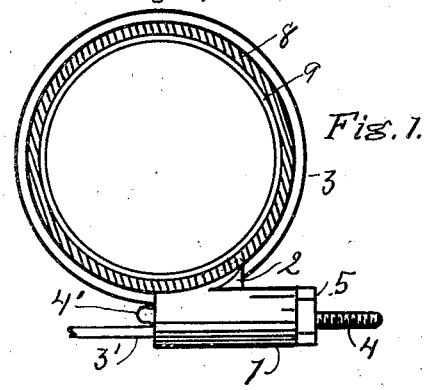
Figure 2:
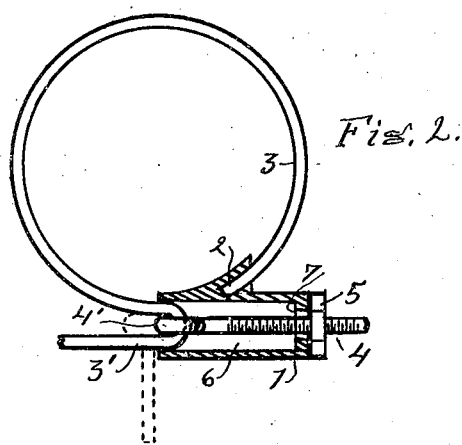
Figure 3:

I attain this object by the construction shown in the accompanying drawing, in which Fig. 1 is an elevation of my clamp complete showing the manner of applying it upon a hose. Fig. 2 is a sectional elevation of the clamp body showing the manner of increasing the strain of the cable or loop around the hose, and, Fig. 3 is an end elevation of the body of the clamp showing its arrangement for receiving and holding the cable and the straining bolt when clamping it upon a hose.

Similar reference numerals indicate similar parts throughout the several views.

The body, 1, of this clamp should be made of some strong, reliable metal, as malleable iron, and must be provided with offset, 6, in its central opening, 7, for the reception and safe anchoring of the end of the cable 3, one end of which must be firmly anchored in the retaining offset 2, as by spot welding, or like process. The other end of this body is provided with a round opening 7 for the free passage of the bolt 4.

In the application of this clamp, after the hose 8 has been passed over the end of the supporting pipe 9, the cable 3 is passed around the hose and the end passed through the opening in the head 4' of the eye bolt 4 and drawn as firmly around the hose as possible, when the end 3' of the cable must be bent backwardly upon itself so the cable cannot possibly slip in the head 4' of the bolt 4, when the bolt and cable must be drawn as snugly as possible into the end of the body 1, by means of the nut 5, in the usual manner, which will insure a perfectly firm, reliable and unyielding clamping of the hose upon its supporting pipe. To release the hose for disconnecting it from its supporting pipe it is simply necessary to unscrew the nut 5 and press the bolt 4 backwardly until the cable is passed out of its bearings in the end of the body, when the end 3' of the cable may be bent downwardly, as indicated by its dotted lines in Fig. 2, and readily removed from the bolt. It is to be understood, as a matter of course, that the bolt 4 should be entirely withdrawn from the body 1 before the cable can be readily removed from the bolt.

It is to be understood that the object of the extensions, 6, in the central opening in the body 1 is to prevent the possibility of the bolt or the cable being made to revolve in the said opening when screwing or unscrewing the nut 5, although the rigidity of the loop formed around the hose by the cable 3 would, to a great extent, prevent this even if the opening were made perfectly round.

The cable 3 should be made of very soft, pliable metal, preferably a twisted cable composed of a number of very fine strands, for the purpose: first, of rendering it easy to manipulate when passing it around the hose and drawing it into the opening in the body, and, second, to avert the possibility of easily breaking the cable when drawing it into the body or when bending it to and fro while passing it into, and removing it out of the opening in the eye bolt, and into and out of the opening in the body.

It will be readily understood that with this clamp the free end of the cable 3 may be made long enough so the clamp may be applied to hose of different diameters, as, for instance, a single clamp may be utilized for clamping a hose anywhere from a half inch up to three inches.

Having thus fully described my invention, what I claim as new in the art, is:

1. In a hose clamp a metallic body having a bolt hole through it longitudinally, a bearing offset upon said body, a screw threaded eye bolt passed through the hole in the body, a nut for adjusting said bolt longitudinally in the hole, a flexible cable firmly connected at one end with the body, with the other end free to pass around a hose and through the eye in the bolt and be firmly clamped around the hose by the longitudinal adjustment of the bolt.

2. In combination with the elements covered in claim 1, the hole through the body so formed that the eye head of the bolt and the folded part of the cable as passed through the eye of the bolt may be drawn into the hole without the possibility of the bolt and cable turning in the hole as the nut is screwed on or unscrewed.

3. In combination with the elements covered in claim 1, the opening through the body of the clamp having extensions forming a cross for the free passage of the eye head upon the bolt and the folded part of the cable passed through the eye of the bolt.

Signed at Muskegon Michigan August 2, 1923.

OWEN A. GAGE.